March 12, 1968    H. A. BELLER ET AL    3,372,775
DISC BRAKES

Filed July 20, 1966    4 Sheets-Sheet 1

United States Patent Office 3,372,77
Patented Mar. 12, 196

3,372,775
DISC BRAKES
Hans Albert Beller, Koblenz-Asterstein, and Heinrich Bernhard Rath, Koblenz-Luetzel, Germany, assignors to Girling Limited, Birmingham, England, a British company
Filed July 20, 1966, Ser. No. 566,632
Claims priority, application Great Britain, July 30, 1965, 32,601/65
5 Claims. (Cl. 188—73)

ABSTRACT OF THE DISCLOSURE

A caliper type disc brake which includes an automatic adjuster for compensating for wear of the frictional elements of the brake wherein the automatic adjuster comprises an axially extendible member whose length is altered by relative rotation of two constituent members brought about by a ratchet and pawl mechanism, the pawl member of which is generally U-shaped to straddle the forward end of a hydraulic piston and includes a resilient biasing finger which serves to retain the pawl in an operative position.

---

Figure 1:
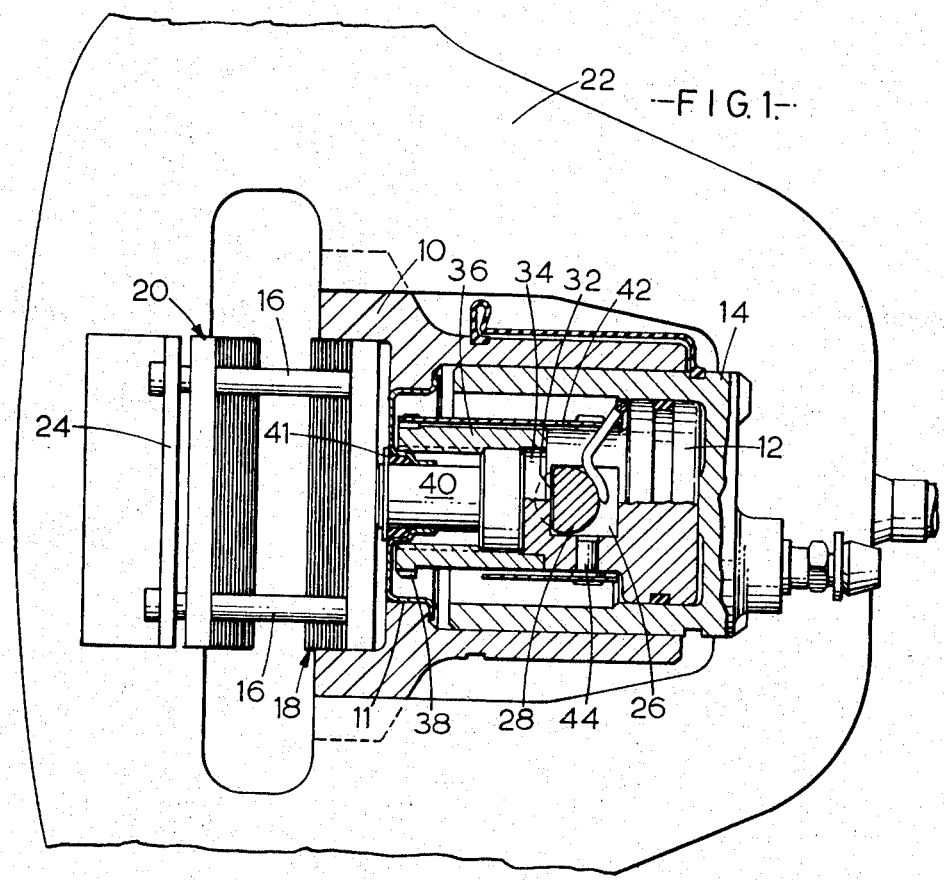

This invention concerns disc brakes and relates more particularly to the provision of an automatic adjuster in hydraulically actuated disc brakes for the purpose of compensating for wear of the frictional elements of the brake.

According to the broadest aspect of the present invention there is provided, in a disc brake in which opposed friction elements are brought into engagement with opposite sides of a brake disc in response to relative displacement of opposed members of an hydraulic actuator, an axially extendible thrust member disposed between one of the opposed members and one of the friction elements, the thrust member comprising a non-rotatable externally threaded core on which is threaded a rotatable sleeve having ratchet teeth formed in its outer surface, a pawl pivotally mounted on said one opposed member and coacting with the ratchet teeth on the sleeve and a fixed abutment cooperating with an abutment formed on the pawl to rock the pawl about its pivot and rotate the sleeve on the core to thereby alter the axial length of the thrust member in response to relative displacement of said opposed members.

Conveniently the hydraulic actuator comprises hydraulic cylinder and piston means.

In one preferred embodiment of the invention the hydraulic cylinder is formed in or carried by a U-shaped caliper which straddles the disc and is pivotally mounted at the end of one limb about an axis which is parallel to the plane of the disc, the piston being arranged to actuate said one friction element into engagement with the disc through the extendible thrust member while the other friction element is carried by the other limb and is actuated into engagement with the other side of the disc by the reaction force consequent upon engagement of said one friction element and the disc.

In another preferred embodiment of the invention the hydraulic cylinder is slidably mounted in a fixed member for movement in an axial direction perpendicular to the plane of the disc, the piston being arranged to actuate said one friction element into engagement with the disc through the extendible thrust member while the hydraulic cylinder is attached to a yoke which straddles the periphery of the disc and acts on the other friction element.

In a further embodiment of the invention the hydraulic cylinder is fixed relative to the disc and the two opposed members comprise two opposed pistons in the cylinder one of the pistons being arranged to actuate said one friction element into engagement with the disc throu; the extendible thrust member while the other pisto is arranged to act on a yoke which straddles the periphe of the disc and acts on the other friction element.

According to another broad aspect of the present i vention a disc brake of the type having a hydraulic act ator including a piston and cylinder assembly for tran mitting braking thrust to a frictional element of tl brake comprises an adjustable strut including an inte nally threaded sleeve engaged with the inner end of tl piston and in turn engaged by an externally threade spindle arranged to act against said frictional elemen a pawl pivotally mounted on said piston and extendin along said sleeve to coact with ratchet teeth forme peripherally around the inner end of said sleeve, a fixe radial pin carried by said cylinder and extending toward an abutment formed on said pawl and means resilientl biasing said pawl in a direction to engage said abutmen with said pin, whereby relative movement between sai piston and said cylinder will cause said pin to swing sai( pawl about its pivot for turning said sleeve to thereb: alter the length of said strut.

Preferably the pawl comprises a generally U-shape( spring steel pressing which straddles the forward end o the piston and is connected thereto at diametrically op posed points, the resilient biasing means taking the forn of a resilient finger at the base of the pressing whicl acts on the sleeve to oppose movement of the abutmen away from the radial pin carried on the cylinder.

Figure 2:
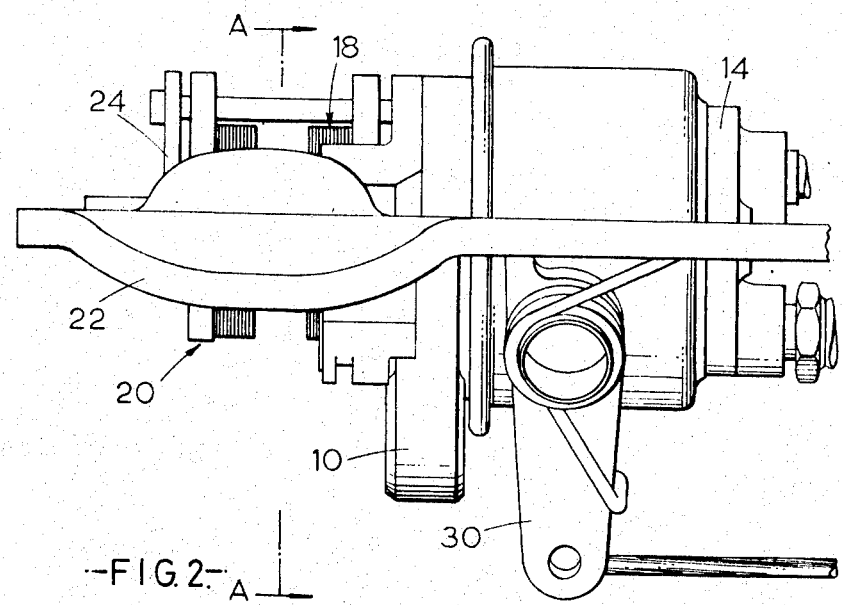
Figure 3:
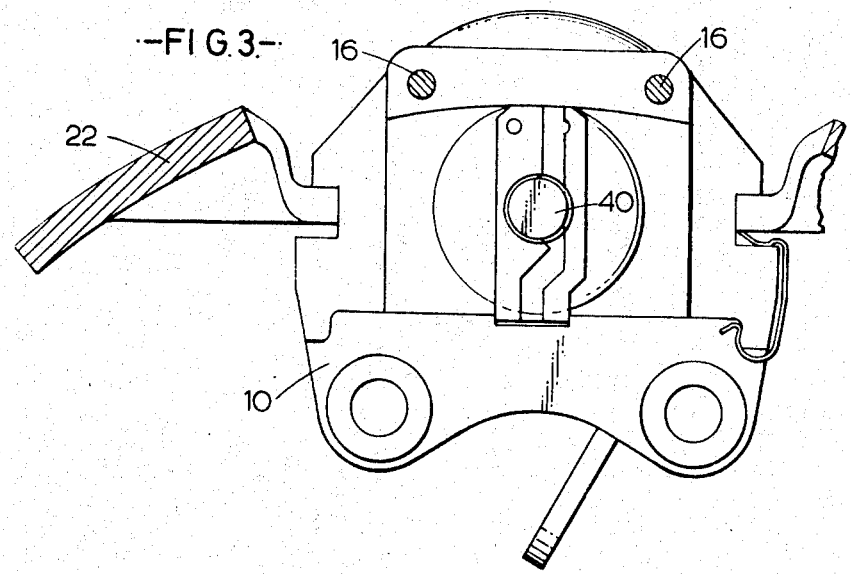
Figure 4:
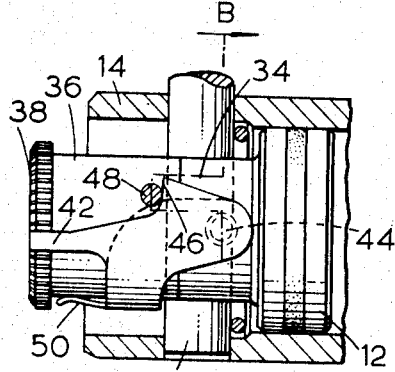
Figure 5:
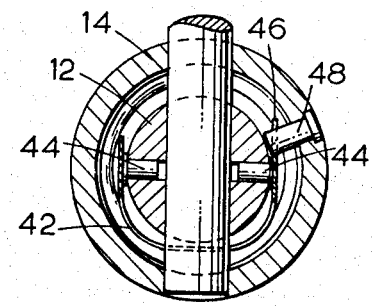
Figure 8:
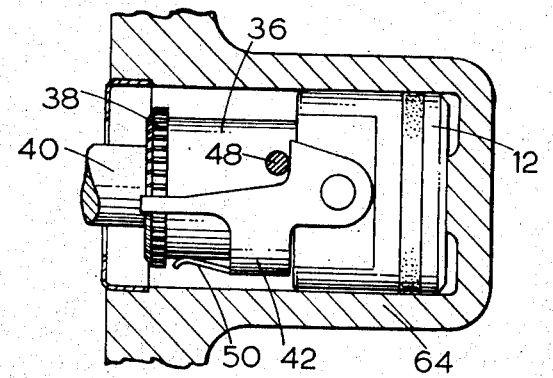
Figure 6:
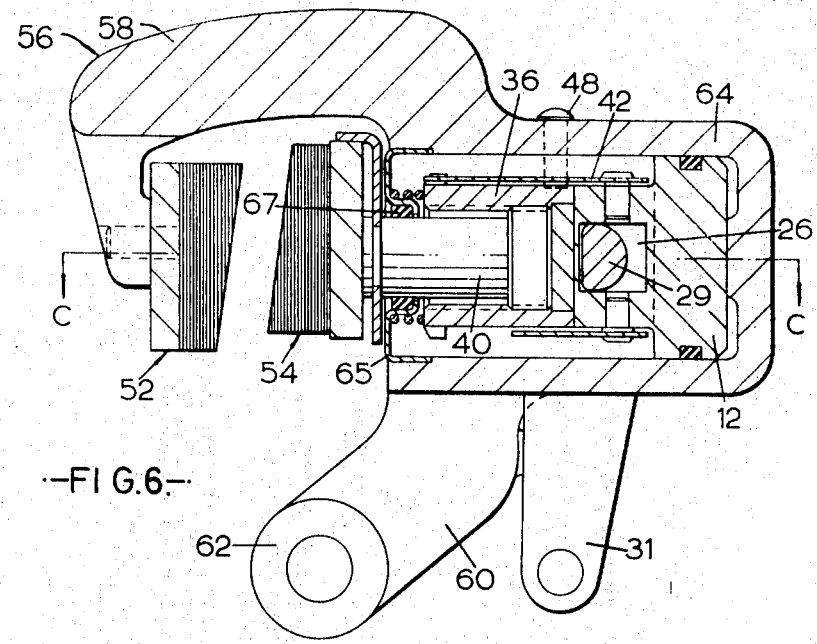
Figure 7:
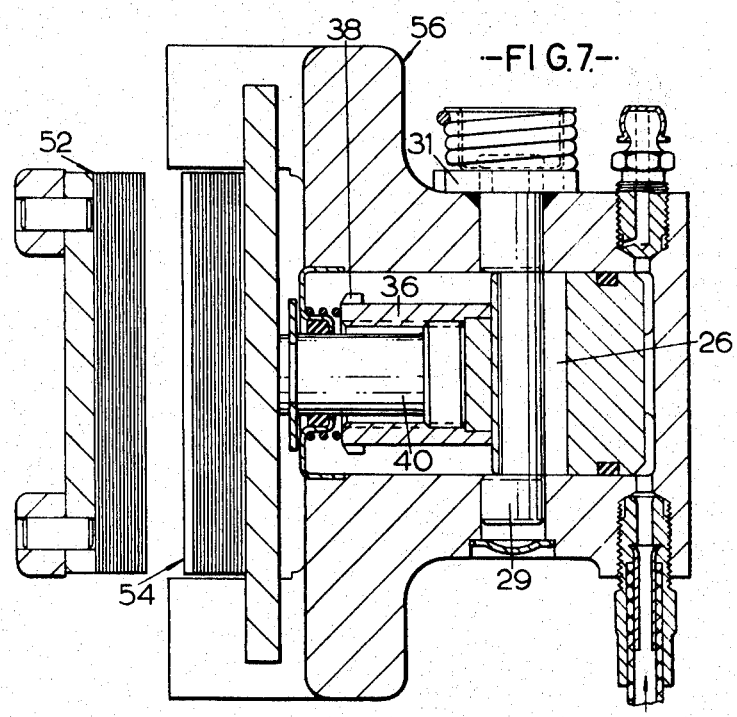

The invention will be described further, by way o example, with reference to the accompanying drawings in which:

FIG. 1 is a plan view, partly in section, of one embodiment of disc brake provided by the invention,
FIG. 2 is a side elevation thereof,
FIG. 3 is a section taken on the line A—A of FIG. 2,
FIG. 4 is a fragmentary side elevation of the hydraulic actuator and adjustable strut,
FIG. 5 is a sectional detail taken on the line B—B of FIG. 4,
FIG. 6 is an axial section of another disc brake embodying the invention,
FIG. 7 is a section taken on the line C—C of FIG. 6, and
FIG. 8 is a detail in side elevation of the actuator and adjustable strut of the brake illustrated in FIGS. 6 and 7.

In the brake shown in FIGS. 1 to 5 a stationary bracket 10 adapted for mounting on a fixed part of a vehicle adjacent one side of a brake disc (not shown) supports a hydraulic actuator including a piston 12 received in an oppositely acting cylinder 14. From the bracket 10, spaced pins 16 extend in an axial direction and support a pair of friction elements 18 and 20 each comprising a pad of friction material secured to a backplate, the arrangement being such that the piston 12 acts on the backplate of the friction element 18, while the cylinder 14 is attached to a generally horizontal yoke or hoop 22 which passes around the bracket 10 and straddles the periphery of the brake disc to act on the backplate of the friction element 20, the yoke 22 having an upstanding flange 24 which receives the free ends of the pins 16. In order to provide for mechanical actuation of the brake in addition to the hydraulic actuation effected by the piston and cylinder, the piston is formed with a diametral hole 26 of square section and through which passes a cam shaft 28 having one end journalled in the cylinder 14 and its other end engaged by a lever 30 mounted on the bracket 10, the lever being operable by a cable 32 in conventional manner to turn the cam shaft 28 within the piston 12. That portion of the cam shaft 28 which is thin the piston 12 is formed with a cam surface 32 and operates with the square edge of the hole 26 in the ston to displace the latter when the lever is turned. It ll be noted that, since the axial width of the hole 26 greater than that of the portion of the cam shaft which s within the hole, the mechanical operation of the ake effected via the lever 30 is independent of the hyaulic operation of the brake.

At its forward end, the piston 12 abuts and supports means of a spigot 34, an internally threaded sleeve formed at its free inner end with peripheral ratchet eth 38. A correspondingly threaded spindle 40 is reived within the sleeve 38 to cooperate therewith in dening a strut of adjustable length, and the inner end of e spindle 40 acts against the backplate of the friction lement 18 to transmit the piston thrust thereto, the indle being keyed against rotation relative to the backlate. To the piston 12 is pivotally attached a pawl 42 hich is in the form of a generally U-shaped spring steel ressing journalled on pins 44 to diametrically opposite oints on the piston and having a recessed edge 46 defining an abutment which bears against a radially fixed pin 8 carried in the cylinder 14. As will be noted more articularly from FIG. 5, the pawl straddles the piston nd has a resilient finger 50 extending from its crown ortion to bear against the sleeve 36 and maintain the butment 46 in engagement with the pin 48. In operation f the brake as herein described, therefore, relative movenent between the piston 12 and cylinder 14 will push he pawl abutment 46 against the cylinder pin 48 to ivot the pawl about its mountings 44, and when this novement becomes sufficient, as a result of wear of the riction elements, the pawl rotates the sleeve 36 through ts ratchet teeth 38 and thus causes an axial displacement of the spindle within the sleeve to adjust the length of the strut. It will be clear that, although in the drawings this adjustment is shown as taking place during brake operation, depending on the arrangement of the ratchet teeth it could alternatively be arranged to occur during brake release.

Referring now to FIGS. 6 to 8, the invention is therein shown applied to a swinging caliper type disc brake. In this embodiment of the invention, friction elements 52 and 54 are respectively supported on the limbs of a generally U-shaped caliper 56, the crown portion 58 of which straddles the brake disc (not shown). The rear limb 60 of the caliper is extended to provide a pair of mounting lugs, of which one lug 62 is visible in FIG. 1 and in use, the caliper is pivotally mounted so as to be capable of swinging on its lugs. The rear of the caliper is provided with a hydraulic cylinder 64 within which is arranged a hydraulic piston 12 having its inner end engaged by an internally threaded sleeve 36 coacting with a correspondingly threaded spindle 40 to constitute an adjustable strut which bears against the backplate of the friction element 54. As in the previous embodiment of the invention, the brake is mechanically as well as hydraulically operable, and the mechanical operation is effected by a cam shaft 29 actuated by a lever 31 and passing through a square section hole 26 in the piston 12. Also similarly to the previous embodiment, the piston carries a pivotally mounted pawl 42 engageable with ratchet teeth 38 at the inner end of the sleeve 36 and having an abutment 46 pressed by a resilient finger 50 against a fixed radial pin 48 secured in the cylinder 64.

In the operation of this embodiment of the invention, the piston 12 is displaced by the supply of hydraulic fluid under pressure to the cylinder 64 and directly urges the friction element 54 into engagement with the brake disc, and the resulting reaction causes the caliper to swing about its mounting to indirectly engage the friction element 52 with the disc. Due to the relative movement between the piston 12 and the cylinder 64, the pawl 42 is pivoted about its mounting on the piston, and when this relative movement assumes a sufficient extent due to wear of the friction elements the pawl rotates the sleeve through its teeth 38 to effect an adjustment in the length of the strut.

In both embodiments of the invention as described herein, therefore, there is provided an automatic adjuster which is operated responsive to brake application by either a hydraulic brake means, usually the service brake, or by mechanical means, usually a parking and/or emergency brake. Since the adjuster is largely housed within the hydraulic cylinder of the brake, the latter is readily enclosed at its inner end, as by a dust cover 11 and spindle seal 41 in FIG. 1 and respectively corresponding components 65 and 67 of FIG. 6. Thus, the adjuster is protected from damage or contamination by dirt, moisture and other corrosive agents. Again, since it is operably responsive to relative movements between the piston and the hydraulic cylinder, the adjuster provided by the invention does not depend for its action upon sensing deflection of brake components which are heavily stressed during brake operations and further, by reason of the engagement of the strut with the piston, the latter is normally maintained in such a position within the cylinder that, throughout the wear period of the friction elements the volume of hydraulic fluid stored in the cylinder remains at a substantially constant minimum value.

It will be appreciated that, although the adjuster described herein is readily applicable to a brake which is operable solely by hydraulic means, it is particularly useful in a brake which is manually operated or which includes manual operating facilities, for example to provide a handbrake for parking and emergency operation. In the latter environment, the adjuster provided by the invention avoids excessive hand brake lever travel which might otherwise be caused by heavily worn, unadjusted brake linings.

We claim:

1. A disc brake of the type having a hydraulic actuator including a piston and cylinder assembly for transmitting braking thrust to a frictional element of the brake and automatic adjuster means to compensate for wear of the frictional elements comprising an adjustable strut including an internally threaded sleeve having ratchet teeth formed peripherally around its inner end, the sleeve being engaged with the inner end of the piston and in turn engaged by an externally threaded spindle arranged to act against said frictional element, a generally U-shaped pawl pivotally mounted about two diametrically opposite points on said piston and straddling the forward end thereof, said pawl extending along said sleeve to coact with the ratchet teeth formed around the inner end thereof, a fixed radial pin carried by said cylinder and extending towards an abutment formed on said pawl and a resilient finger at the base of the pawl which acts on the sleeve in a direction to engage said abutment with said pin whereby relative movement between said piston and said cylinder will cause said pin to swing said pawl about its pivot for turning said sleeve to thereby alter the length of said strut.

2. A disc brake as set forth in claim 1 wherein the pawl is formed from a spring steel pressing.

3. A disc brake as set forth in claim 1 including mechanically operable means acting on the piston.

4. A disc brake as set forth in claim 3 wherein the mechanically operable means comprises a cam shaft which passes through a diametral hole of square section in the piston and is journalled at one end in the cylinder, a lever engaging the other end of the shaft, a cable, coupled to the lever for turning the cam shaft within the piston, that portion of the cam shaft that lies within the piston being formed with a flat cam surface which cooperates with the square edge of the hole in the piston to displace the latter when the shaft is turned.

5. A disc brake as set forth in claim 4 wherein the axial width of the hole in the piston is greater than the thickness of the portion of the cam shaft within the piston whereby the mechanical operation of the brake effected via the lever and cable is independent of the hydraulic operation of the brake.

References Cited

UNITED STATES PATENTS

| | | | |
|---|---|---|---|
| 2,669,327 | 2/1954 | Chamberlain et al. | 188—72 |
| 2,966,964 | 1/1961 | Brueder | 188—73 |
| 3,158,234 | 11/1964 | Henderson | 188—72 X |
| 3,245,500 | 4/1966 | Hambling et al. | 188—73 |
| 3,255,848 | 6/1966 | Harrison | 188—73 |
| 3,266,602 | 8/1966 | Belart et al. | 188—72 |

FOREIGN PATENTS 971,799  10/1964  Great Britain.

MILTON BUCHLER, *Primary Examiner.*

FERGUS S. MIDDLETON, *Examiner.*

G. E. HALVOSA, *Assistant Examiner.*